Sept. 27, 1932. P. W. KNAUF 1,880,186
QUICK OPENING STEAM VALVE ACTUATED BY A CYLINDER
Filed Oct. 6, 1931 2 Sheets-Sheet 1

WITNESS:
Rob R Kitchel.

INVENTOR
Paul W. Knauf
BY
Augustus G. Stoughton
ATTORNEY.

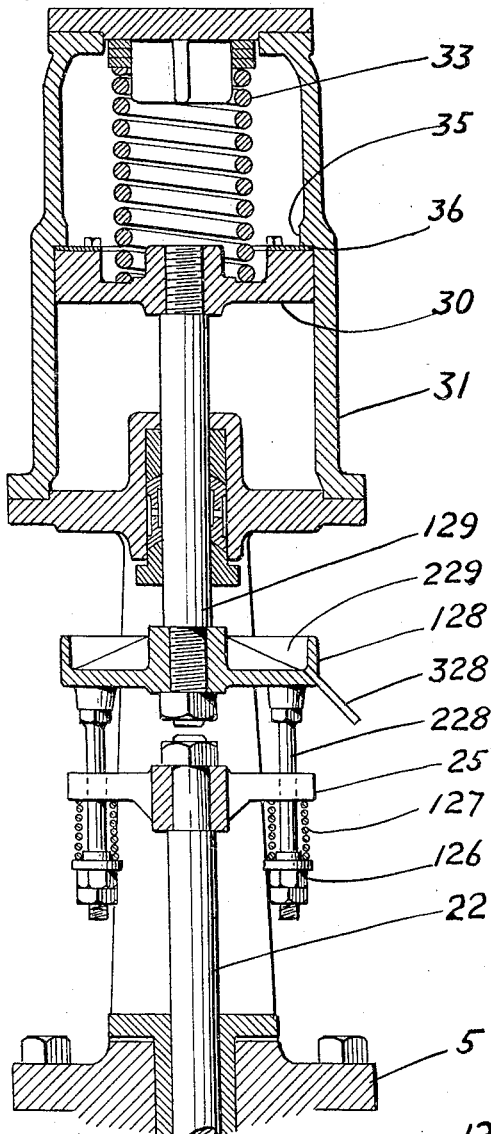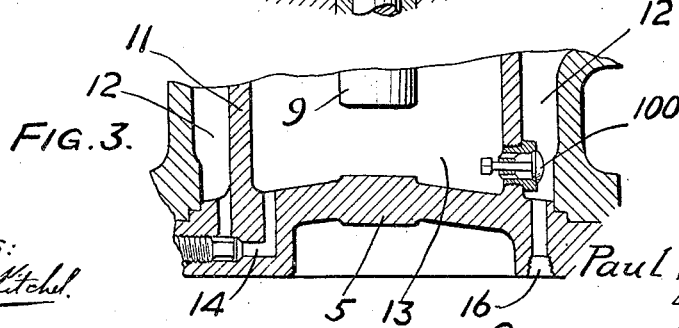

Patented Sept. 27, 1932

1,880,186

UNITED STATES PATENT OFFICE

PAUL W. KNAUF, OF CYNWYD, PENNSYLVANIA, ASSIGNOR TO SCHUTTE & KOERTING COMPANY, OF PHILADELPHIA, PENNSYLVANIA, A CORPORATION OF PENNSYLVANIA

QUICK OPENING STEAM VALVE ACTUATED BY A CYLINDER

Application filed October 6, 1931. Serial No. 567,174.

The subject of my invention is a valve suitable for use as a quick actuating steam relief valve and provided with an actuating oil cylinder having a spring loaded piston.

It is a feature of my device that the actuating rod between the piston and the movable valve elements is made of several parts in the form of a yoke or other device so that the oil cannot leak from the actuating cylinder along the actuating rod.

It is another feature of my invention to provide in the actuating cylinder a stop for the actuating piston and to provide means between said stop and said piston to prevent the leakage of oil around said piston.

It is yet another feature of my invention to provide a lost motion connection between the piston and the movable parts actuated thereby so that the movable valve parts may seat before the actuating piston has completed its travel. Yet a further feature of my invention is to provide drainage means from the inlet side of the valve.

Yet a further feature of my invention is to provide a check valve between the pilot chamber and the valve chamber so that the condensate may be drained from the pilot chamber to the valve chamber and thence through the drain from the valve chamber.

For a further exposition of my invention reference may be had to the annexed specification and drawings at the end whereof my invention will be specifically pointed out and claimed.

In the drawings,

Figure 2 is a vertical cross section of a modified form of actuating mechanism.

Figure 3 is a vertical cross section of a portion of the valve casing showing a modified form of drainage.

Figure 1:
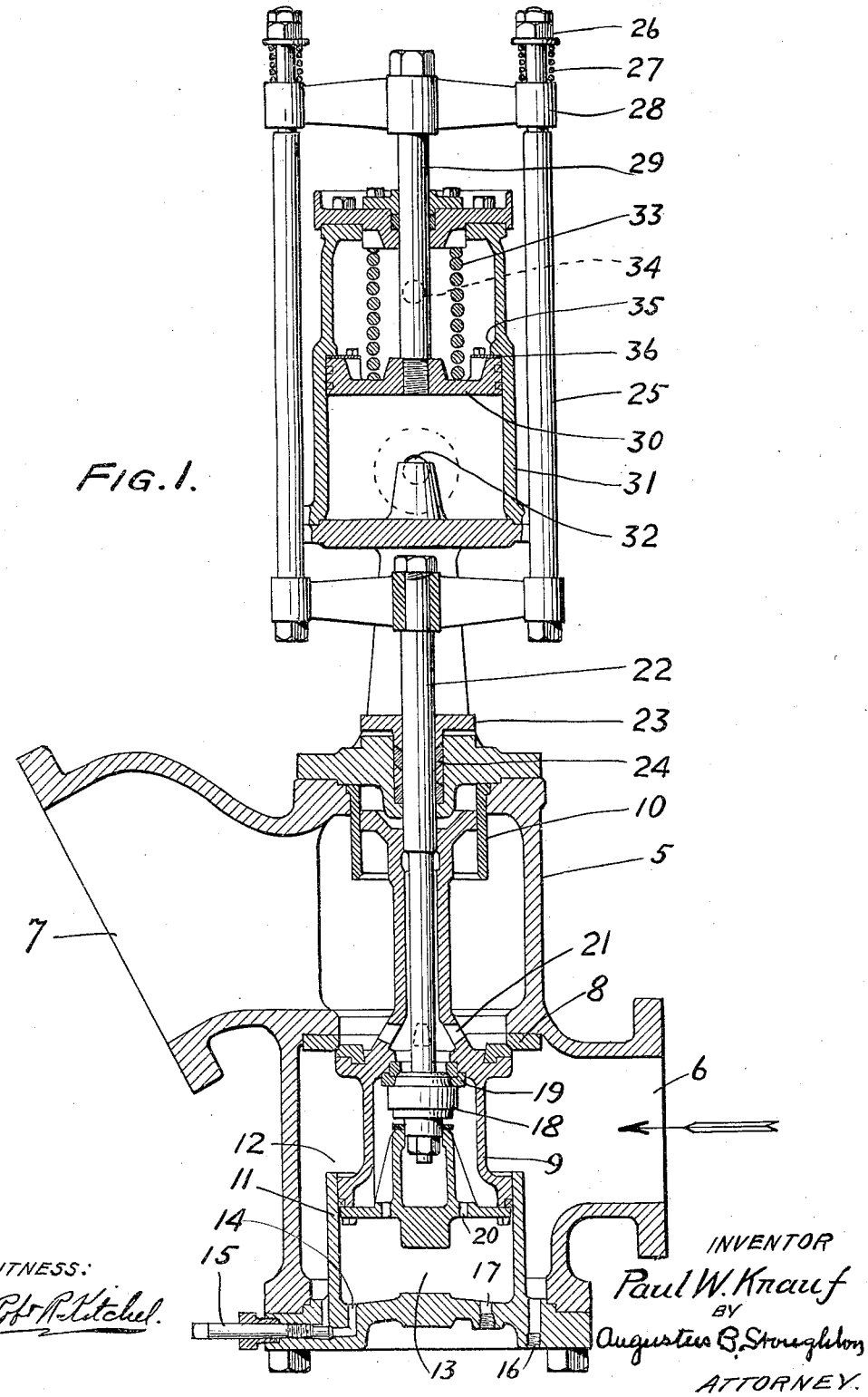
Figure 1 is a vertical elevation with parts in cross section through my valve shown in closed position.

In the embodiment of my invention chosen for illustration in the drawings, the valve is shown as consisting of a valve casing 5 having an inlet port 6 and an outlet port 7. In its interior portion the valve is provided with a seat 8 with which cooperates a valve spool 9 which is guided at its upper end in the guide cylinder 10 and which is guided at its lower end in the cylindrical partition wall 11. The partition wall 11 serves to divide one portion of the interior of the valve casing 5 into a valve chamber communicating with said valve seat and the inlet opening 6 and generally indicated at 12 and a pilot chamber generally indicated at 13. Communication is provided between the valve chamber 12 and the pilot chamber 13 by a passage generally indicated at 14, the passage 14 being controlled by a throttle screw 15. From the valve chamber 12 there is provided a drain 16 which is connected to one steam trap or other drain (not shown). Pilot chamber 13 is provided with a separate drain 17 which is connected to another steam trap or drainage system (not shown) than that to which drain 16 is connected. Within spool 9 and cooperating therewith there is provided a pilot valve 18 which is slidable relative to spool 9 and which cooperates in one position with a valve seat 19 to control the flow of steam or other fluid from the pilot chamber 13 through ports 20 and the ports 21 in the spool.

Connected to the pilot valve 18 is an actuating element 22 shown in the form of a rod which passes out of the valve casing 5 through a gland 23 having stuffing box packing 24 therein cooperating with the actuating element 22. At its upper end actuating element 22 carries a yoke 25 which has at its upper ends nuts 26 bearing on springs 27 which in turn bear on a cross head 28. Springs 27 provide a lost motion connection between the yoke 25 and the cross head 28. Cross head 28 carries a piston rod 29 which cooperates with a piston 30 carried in cylinder 31 which is connected to the valve casing 5. Cylinder 31 has an orifice 32 therein which serves as a pressure supply and discharge connection for the oil or other fluid, such as water or air which may be used as the actuating medium for piston 30. Piston 30 is stressed on its upper side by a spring 33 which is in compression as shown in Figure 1. The chamber above the piston 30 is provided with an oil leak off connection 34 to permit the escape of any oil which may leak past piston 30. Cylinder 31 is provided with stops 35 which checks or stops the piston 30 in its upmost position. There is provided between stop 35 and piston 30 a sealing ring 36 which is conveniently made of flexible fiber. This sealing ring may be mounted on either the piston 30 or the cylinder 31. Because piston 30 moves so infrequently, this sealing ring is necessary to prevent excessive leakage of oil or other actuating fluid around the piston 30.

In Figure 2 there is disclosed a slightly modified form of actuating apparatus for the valve. From the upper end of valve casing 5 projects an actuating rod 22 having a yoke 25 thereon. Yoke 25 bears upon springs 127 which in turn bear on nuts 126 carried by rods 228 which cooperate with a second yoke 128. Yoke 128 may be provided on its upper surface with a cavity or orifice 229 which serves to receive any oil which may leak along the piston rod 129 from the actuating cylinder 31. The second yoke 128 may, if desired, be provided with a lead off pipe 328 which may be connected by a lost motion connection to any suitable oil storage means. The piston rod 129 is connected at its upper end to piston 30. Spring 33 presses upon piston 30. Cylinder 31 is provided with a circular stop 35 which serves to locate the upper or normal position of the piston 30. There is provided a flexible sealing ring 36 between the stop 35 and the piston 30.

In Figure 3 there is disclosed a modified form of drainage. The valve casing 5 contains the valve chamber 12 and the piston chamber 13 which are in communication through the port 14 as explained above. Valve chamber 12 is provided with a drain 16. In the circular partition wall 11 which separates the valve chamber 12 from the piston chamber 13 there is provided a check valve 100 designed so as to open when there is an excess of pressure in the pilot chamber 13 and to close when there is an excess of pressure in the valve chamber 12. It will thus be seen that when there is a slight excess head of condensate in the pilot chamber 13 this will open the check valve 100 and flow into the valve chamber 12 whence it escapes through the drain 16 to a steam trap or other source of disposal (not shown).

In the embodiment shown in the drawings, which has been selected from many other embodiments which my invention may take, the valve is designed to operate as a quick opening steam release valve. In Figure 1 the valve is shown in its normal or closed position. Oil, water, air or other actuating fluid is maintained within the cylinder 31 under sufficient pressure to maintain the piston 30 against the stop 35 against the pressure of spring 33 and the weight of the pilot valve 18, the valve spool 9 and the actuating element 22. When it is desired to actuate the valve the pressure on the fluid within cylinder 31 is released. This permits the pressure of spring 33 and the weight of the movable parts to move piston 30, piston rod 29, cross arm 28, yoke 25, actuating rod 22 and pilot valve 18. Due to the lost motion connection between the pilot valve 18 and the valve spool 9, the pilot valve 18 moves away from the pilot valve seat 19 and opens steam communication from the inlet port 6 to outlet port 7 through port 14, pilot chamber 13, ports 20 and 21. Due to the restricted size of port 14 this quickly equalizes the pressure in pilot chamber 13 and in outlet port 7. Pressure is therefore removed from the lower face of valve spool 9 and upon continued movement of actuating rod 22, pilot valve 18 engages valve spool 9 and moves valve spool 9 away from valve seat 8 thus opening the main communication between inlet port 6 and outlet port 7.

Upon movement of the piston 30 in the reverse direction pilot valve 18 first contacts with spool 9 at pilot valve seat 19. Further movement of actuating rod 28 moves pilot valve 18 and valve spool 9 until valve spool 9 contacts with seat 8. Springs 27 then form a lost motion connection and permit further movement of piston 30 which serves to further compress springs 27 and 33 until piston 30 engages stop 35.

The mode of operation of the modified form of actuating element shown in Figure 2 is identical with that described in connection with the modification disclosed in Figure 1 except that the shape of the actuating element has been varied somewhat.

While I have described my novel valve as designed for the control of steam it is obvious that it may control the flow of many other fluids and that it may be designed either for normal closed position or normal opened position. Moreover, my novel valve may be designed to move up vertically instead of down vertically as described in the modification chosen or my valve may be designed so that its axis of movement is horizontal or at any other angle. It is, of course, obvious that the drainage arrangement disclosed in Figure 2 is only useful when the cylinder 31 is above the valve and when the axis of movement approaches the vertical.

I do not intend to be limited in the practice of my invention save as the scope of the prior art and of the attached claims may require.

I claim:

1. A valve including in combination a valve casing having inlet and outlet ports therein, a valve seat in said casing, a valve spool cooperating with said valve seat, a pilot valve cooperating with said valve spool, a partition in said valve casing defining a valve chamber communicating with said valve seat and said inlet port, a pilot chamber adjacent said pilot valve, means for conducting fluid from said valve chamber to said pilot chamber, a drain from said valve chamber, a check valve opening from said pilot chamber to said valve chamber, an actuating element for actuating said pilot valve and said spool, a lost motion connection between said pilot and said spool, a cylinder connected to said casing, a piston in said cylinder for moving said actuating element, and a lost motion connection between said piston and said actuating element.

2. A valve including in combination a valve casing, a valve spool in said casing, a pilot valve in said casing, an actuating rod connected to said pilot valve, a yoke connected to said actuating rod, springs carried by said yoke, a cross head engaging said springs and said yoke by a lost motion connection, a piston rod connected to said cross head, a piston connected to said piston rod, and a cylinder cooperating with said piston.

3. A valve including in combination a valve casing, a valve spool in said casing, a pilot valve in said casing, an actuating rod connected to said pilot valve, a yoke connected to said actuating rod, a second yoke, a lost motion connection between said first and said second yokes, a piston rod connected to said second yoke, a piston connected to said piston rod, a cylinder cooperating with said piston, and means on said second yoke for storing fluid leaking from said cylinder along said piston rod.

PAUL W. KNAUF.